2 Sheets—Sheet 1.

J. BRAUER.

ICE HOUSE, ICE BOX, AND REFRIGERATOR.

No. 10,136. Reissued June 13, 1882.

WITNESSES

Chas. Hoopu.

S. F. Helcher.

INVENTOR

Justus Brauer, by J. E. Brady

Attorney

2 Sheets—Sheet 2.

J. BRAUER.

ICE HOUSE, ICE BOX, AND REFRIGERATOR.

No. 10,136. Reissued June 13, 1882.

WITNESSES

Chas. Hooper.

Jo. F. Shelcher.

INVENTOR

Justus Brauer,

By T. C. Brecht

Attorney

UNITED STATES PATENT OFFICE.

JUSTUS BRAUER, OF PHILADELPHIA, PENNSYLVANIA.

ICE-HOUSE, ICE-BOX, AND REFRIGERATOR.

SPECIFICATION forming part of Reissued Letters Patent No. 10,136, dated June 13, 1882.

Original No. 244,374, dated July 19, 1881. Application for reissue filed May 22, 1882.

*To all whom it may concern:*

Be it known that I, JUSTUS BRAUER, a citizen of the United States, residing at Philadelphia, in the county of Philadelphia and State of Pennsylvania, have invented certain new and useful Improvements in Ice-Houses, Ice-Boxes, &c., of which the following is a specification, reference being had therein to the accompanying drawings.

My invention relates to improvements in ice-houses, ice-boxes, refrigerators, and other receptacles in which articles are to be preserved or cooled by cooling the air; and the object is to construct receptacles of this kind in such a manner that the articles contained or to be stored therein will remain fresh and will not spoil, while beer and malt liquors are kept under a more regular and even temperature than in ice-houses as now ordinarily constructed. At the same time, by having an even temperature, a large quantity of ice, especially in large ice-houses, can be saved, while in those as now constructed the temperature is not uniform, and has to be forced at the expense of large quantities of ice.

The invention consists principally in employing granulated cork so closely packed as to form practically a solid mass between the walls or sides and top and bottom, and in such a manner that the inner and outer walls thereof are preferably entirely isolated from each other by cork packed around the uprights.

It also consists of a peculiar open drip-floor, so that the condense-water will be guided to suitable gutters, from which it is carried off in any suitable manner. The drip-floor can be made to conform to any shape, either arch, incline, hip, or other formed roof or ceiling. The foul air, evaporation, and stench caused by meats and similar articles can freely ascend between the spaces formed between the slats or ledges of the drip-floor, while the cold air from the ice on the grated floor can pass freely down and assist in always maintaining an even and regular temperature.

It also consists in the construction and arrangement of certain parts, as will be more definitely described hereinafter, reference being had to the accompanying drawings, in which—

Figure 1:
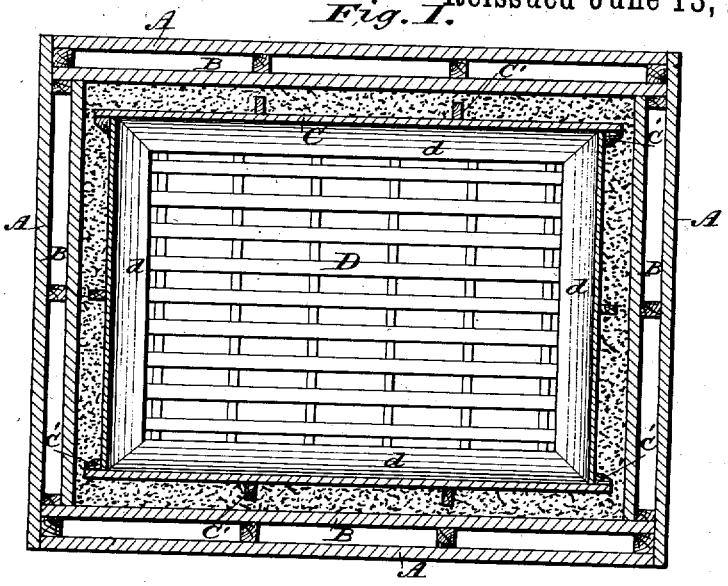
Figure 2:
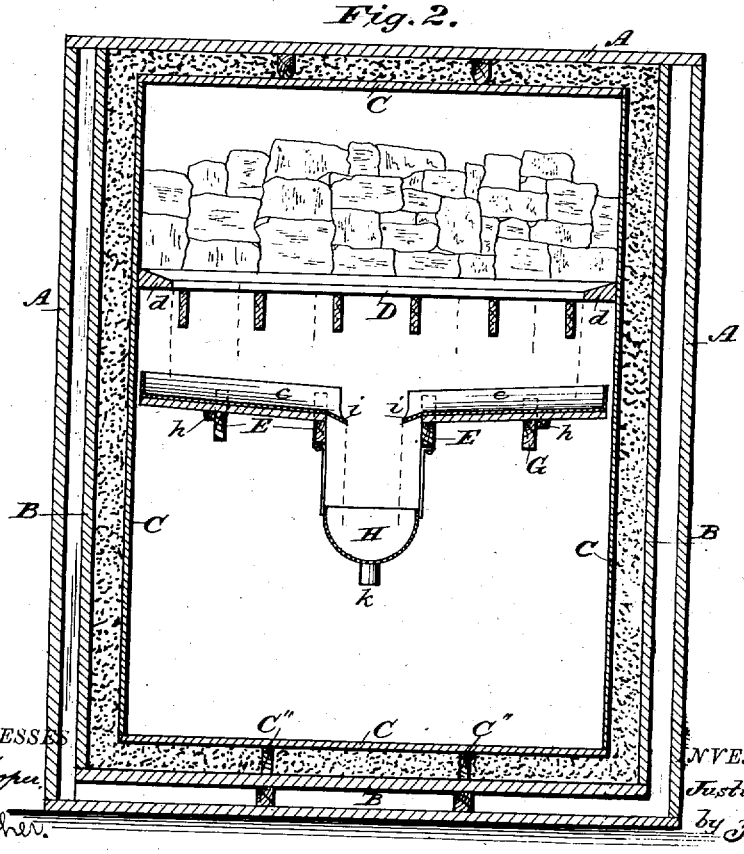
Figure 3:
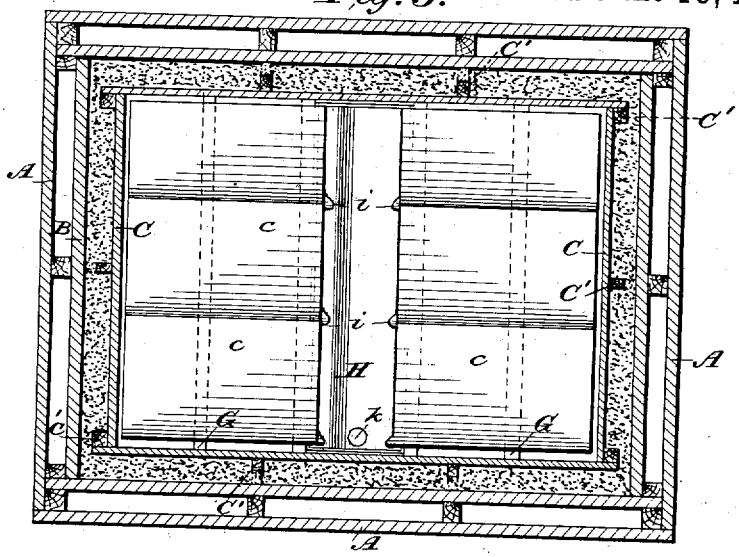
Figure 4:
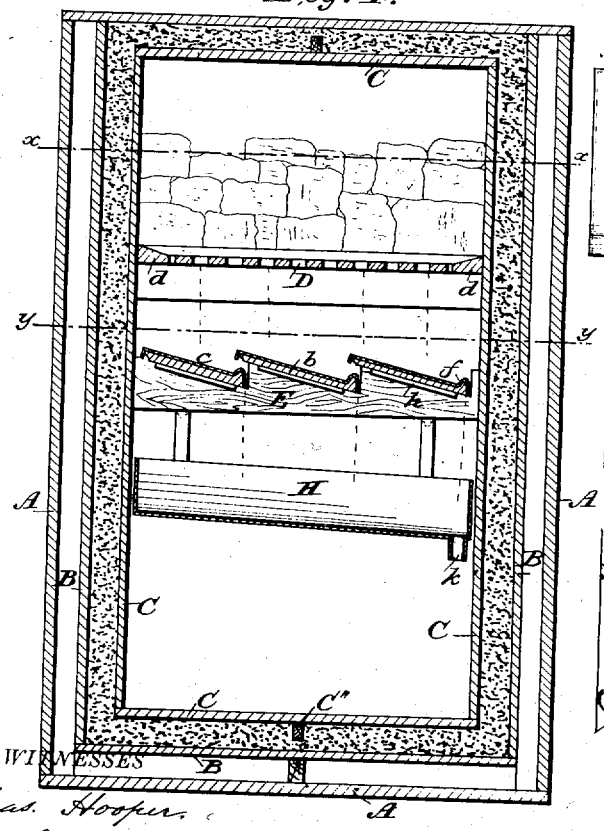
Figure 5:
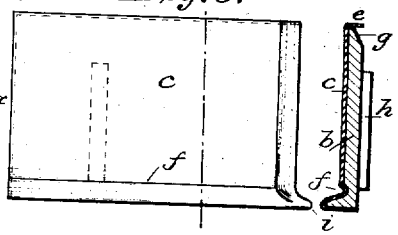
Figure 6:
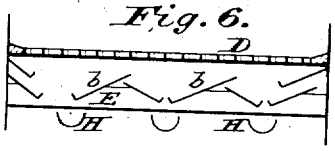
Figure 7:
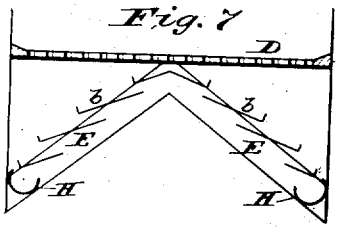

Figure 1 is a horizontal section, on line *x x* of Fig. 4, of an ice-house. Fig. 2 is a vertical central cross-section of the same. Fig. 3 is a horizontal section on line *y y*. Fig. 4 is a vertical central cross-section at right angles to Fig. 2. Fig. 5 is a plan and section of one of the ledges. Figs. 6 and 7 are diagrams of the modified arrangements of the drip-floor.

In the drawings, A and B are the inner and outer walls of an ice-house, between which an air-space is formed. On the inside of the wall B is arranged a lining, C, properly supported by uprights C′ and cross-pieces C″. The space between this lining C and wall B is packed with very closely-rammed granulated cork of nearly uniform particles, and to form practically a solid mass. It is very important that the proper quantity and thickness of cork be applied in ice-houses, and I have ascertained by actual experience that about four to five inches will withstand any degree of heat from penetrating through the walls, while ordinarily about fourteen inches is required. In the upper part of the ice-house or refrigerator is arranged the grated floor D, upon which the ice is supported; and around the floor D is secured to the wall B an inclined ledge, *d*, by which all drip-water is conducted away from the wall C, and thereby prevents the wood-work of the wall from rotting. The water falls upon the drip-floor E, which is of peculiar construction. It consists of ledges or slats F, which are constructed of boards *b*, Fig. 5, covered with galvanized or other suitable metal, *c*, bent over one of the edges, as shown at *e*. The boards *b* are recessed at one side, as shown at *g*, to prevent any drip-water from lumps of ice which might lodge at that side from being drawn against the ledge-boards by capillary attraction. At the opposite side of the ledge are formed gutters *f*, for conducting the drip-water to the lowest corner of the ledges, which forms a tongue or point, *i*, from which all the drip-water drops off into the gutters below, as shown in Figs. 2 and 4. The girders may, however, be cut in any desired manner for supporting the ledges, and to suit different-shaped ceilings or roofs, examples of which are shown in Figs. 6 and 7.

Under the drip-floor E is secured in any suitable manner one or more gutters, H, slightly inclined, and having an outlet-spout, *k*, through which the water can pass to any desired place or receptacle.

By arranging the ledges in the manner shown they can be easily cleaned from below of sawdust, slime, &c., and replaced in position. The cold air can freely circulate between the overhanging sides of the ledges, and all foul odors are obviated, especially in butchering or similar establishments.

The walls may be built of brick, stone, or other material when building an ice-house, and, if desired, the air-space may be extended in the roof or ceiling.

I am aware that cork loosely applied between the walls of refrigerators has been employed; but this has been found to be impracticable and no better than sawdust and similar articles, and only by a long series of experiments have I discovered that to practically employ granulated cork in ice-houses, &c., it must be closely packed, and to do this properly the cork should be of a nearly uniform size of particles prepared to pack closely, so as to form a nearly solid mass.

Having thus described my invention, what I claim is—

1. In an ice-house or refrigerator having an air-space between its inner and outer walls, A B, a lining, C, forming a space to be filled with closely-packed granulated cork of nearly uniform size, substantially as specified.

2. An ice-house or refrigerator consisting of inner and outer walls, A B, forming an air-space, and a lining, C, forming a space to be filled with closely-packed granulated cork, a grated floor, and a drip-floor, constructed substantially as shown and specified.

3. In an ice-house or refrigerator having inner and outer walls, forming an air-space, and a supplementary space packed with closely-rammed granulated cork, the inclined ledge *d*, arranged as shown, and for the purpose herein specified.

4. In an ice-house or refrigerator provided with an air-space between its inner and outer walls, and having a supplementary space packed with closely-rammed granulated cork, a drip-floor consisting of girders supporting removable ledges, provided with gutters *f*, overhanging edges *e*, and recesses *g*, constructed substantially as shown and specified.

5. In an ice-house or refrigerator having inner and outer walls, forming an air-space, an inner space packed with closely-rammed granulated cork, a drip-floor, constructed as described, and gutters for carrying off the drip-water, all arranged substantially as shown and specified.

6. The ice-house herein described, having inner and outer walls, A B, forming an air-space, lining C, forming a supplementary space, packed with closely-granulated cork, a grating, D, inclined ledge *d*, drip-floor E, provided with removable ledges F, and gutter H, all constructed and arranged as shown and specified.

7. An ice-house having inner and outer walls, A B, forming an air-space, and a lining, C, forming a space packed with closely-rammed granulated cork, in combination with a grated floor, D, inclined ledge *d*, drip-floor E, constructed substantially as described, and suitable gutters for carrying off the drip-water, all substantially as specified.

8. An ice-house, refrigerator, &c., having inner and outer walls, A B, forming an air-space, with an inner lining, C, the space between which and wall B is filled with granulated cork of nearly uniform size and packed by ramming to form a compact mass, substantially as herein specified.

9. An ice-house or refrigerator having walls, sides, top, and bottom made double, and the space filled in with closely-packed granulated cork of nearly uniform size, forming a practically solid mass, substantially as specified.

10. An ice-house or refrigerator having double walls, sides, top, and bottom, and filled with granulated cork of nearly uniform size, and so closely packed as to form a practically solid mass, substantially as set forth.

11. In ice-houses or refrigerators, an open drip-floor composed of independent ledges arranged in such manner as to leave an unobstructed air-passage between the edges of said ledges and allow a free circulation of air, substantially as shown and specified.

12. In ice-houses or refrigerators, an open drip-floor composed of removable ledges arranged on supports in such inclined manner that the adjoining edges overlap each other to prevent water dripping into the room below, while the spaces between the edges form unobstructed passages for the circulation of air, substantially as specified.

13. In ice-houses or refrigerators, the ledges F, consisting of boards *b*, having recessed sides *g*, and covered with suitable metal, *c*, bent over the edges, as at *e*, and forming a tongue, *i*, substantially as shown and described.

In testimony whereof I affix my signature in presence of two witnesses.

JUSTUS BRAUER.

Witnesses:
LLOYD F. KELEHER,
A. T. SANGSTON.